Sept. 26, 1967   H. J. VAN DOORNE   3,343,621
MEANS FOR DRIVING TANDEM WHEELS ON EACH SIDE OF A VEHICLE
Filed Dec. 31, 1964   2 Sheets-Sheet 1

INVENTOR
HUBERTUS J. VAN DOORNE

BY *Wenderoth, Lind & Ponack*
ATTORNEYS

Sept. 26, 1967   H. J. VAN DOORNE   3,343,621
MEANS FOR DRIVING TANDEM WHEELS ON EACH SIDE OF A VEHICLE
Filed Dec. 31, 1964   2 Sheets-Sheet 2

INVENTOR
HUBERTUS J. VAN DOORNE

BY Wenderoth, Lind & Ponack
ATTORNEYS

United States Patent Office 3,343,621
Patented Sept. 26, 1967

3,343,621
MEANS FOR DRIVING TANDEM WHEELS ON EACH SIDE OF A VEHICLE
Hubertus J. van Doorne, 54A Stationsstraat, Deurne, Netherlands
Filed Dec. 31, 1964, Ser. No. 422,759
Claims priority, application Netherlands, Dec. 31, 1963, 302,979
2 Claims. (Cl. 180—74)

This invention relates to a vehicle drive and more particularly to a means for driving four wheels of a motor vehicle having at each side two wheels placed in tandem.

Motor vehicles having two pairs of wheels placed in tandem are known in which only one wheel of each pair is driven by the vehicle motor and in which the drive of said one wheel is transmitted to the other wheel of the same pair by means of a roller, such as a friction roller, that is arranged in continuous frictional engagement with both wheels of the same pair. Motor vehicles of this character are also known in which a power transmitting roller or idler is displaceable up and down in order either to be normally free from both wheels of a pair, or to be brought into engagement with both wheels to transmit the drive from the power driven wheel to the other wheel of the same pair, so that traction is improved when the condition of the road should require so.

It is an object of the present invention to provide a simple and efficient four wheel drive for a motor vehicle.

Another object of the present invention is to provide a motor vehicle with a simple suspension system that makes conventional spring means superfluous.

Still another object of the present invention is to provide a light four wheel driven motor vehicle that is particularly adapted to be used as a cross-country vehicle.

Still another object of the present invention is to provide a motor vehicle having two pairs of wheels placed in tandem which are movable in such a way that a frictional engagement between said wheels and a driving roller is enhanced by the reaction of the ground on which said vehicle is driven.

Still another object of the present invention is to provide a motor vehicle having a simple and efficient suspension system allowing each of the wheels of a tandem pair to follow irregularities of the ground independently of the other wheel of the same pair and independently of the wheels of the tandem pair at the other side of the vehicle.

Still another object of the present invention is to provide a motor vehicle having tandem wheels equipped with cross-country tires and in which the driving means serve at the same time to clean said tires when they should be clogged by mud or snow. Still another object of the present invention is to provide a motor vehicle having at each side a pair of wheels placed in tandem in which the tandem wheels at one side of the vehicle may be driven at a speed different from the driving speed of the tandem wheels at the other side of the vehicle in order to provide means for steering said vehicle.

Still another object of the present invention is to provide a four wheel drive for a vehicle that is equipped with more than four wheels.

Other objects and advantages of the invention will be understood from the following description with reference to the accompanying drawings in which some embodiments of a four wheel driven vehicle are shown in a diagrammatic way.

In these drawings:

FIG. 1 is an elevation as seen from the left-hand side of a four wheel motor vehicle according to one embodiment of the invention, having a non-displaceable driving roller, FIG. 2 is a top view of the vehicle according to FIG. 1 showing in a schematic way how the rollers are driven by the vehicle engine, FIG. 3 is a side elevation of a second embodiment, the wheels are carried by arms arranged in a different way, FIG. 4 is a side elevation of a third embodiment in which the driving rollers are displaceable forwards and backwards.

Figure 1:
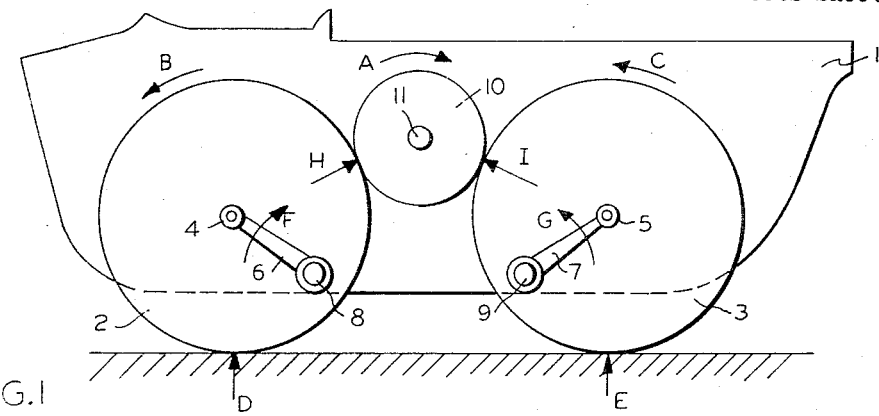
Figure 2:
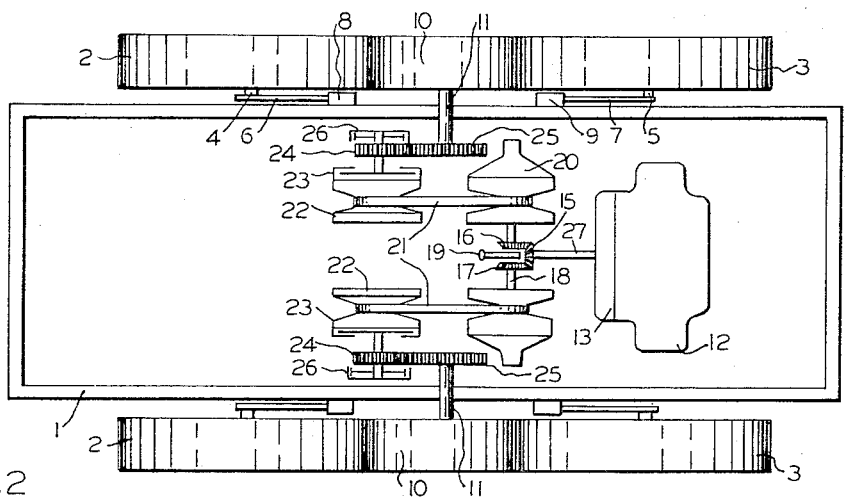

The vehicle shown in FIGS. 1 and 2 has a body 1 of which only the circumference is represented. If desired, this body may be executed in a watertight way to procure a floating body so that the vehicle may be used as an amphibious vehicle.

At each side of the vehicle body 1 two road wheels 2 and 3 are arranged in tandem of which wheels only the peripheries are shown. Said wheels are rotatable about stub axles 4 and 5 respectively, which stub axles are supported by respective arms 6 and 7. These arms are adapted to swing about pivots 8 and 9, respectively, which are fixed to said vehicle body 1.

A roller 10 is arranged at each side of the vehicle in driving engagement with both of said tandem wheels 2 and 3. The shaft 11 of each roller 10 is driven by the engine of the vehicle. It is evident that the way in which the rollers 10 are driven may be devised in a plurality of ways each known by itself. However, I have chosen to use for the embodiment, shown in FIG. 2, a V-belt transmission of the kind shown in FIG. 1 of U.S. Patent 2,980,196 in the name of Joan van der Brugghen of Apr. 18, 1961. The transmission shown and described in said U.S. patent is an automatic variator and is used on the many DAF-passenger cars, so that this special kind of drive is generally known and does not constitute a part of the present invention.

In order to elucidate the way in which the automatic variator is applied to the embodiment shown in FIGS. 1 and 2 reference may be made to FIG. 2 showing an engine 12 which has been arranged in the body 1. The said engine drives by means of an automatic centrifugal clutch arranged in a casing 13, and a drive shaft 27, a bevel pinion 15. This pinion is in constant mesh with two bevel gear wheels 16 and 17 rotatably arranged on a primary pulley shaft 18, but either of them adapted to be coupled with said shaft 18 by means of a swinging fork 19, thus forming a reversing gear.

Said shaft 18 carries two axially expansible primary pulleys 20, each of which is connected by a V-belt 21 with a secondary pulley 22. Said secondary pulleys are each provided with a clutch 23 by means of which it can be coupled with, or uncoupled from, a gear wheel 24 meshing a gear wheel 25 fixed on the above-mentioned shaft 11 of the roller 10. Brakes 26 are arranged on the shafts of the gear wheels 24.

Now, referring to FIG. 1 it is supposed that the roller 10 is driven in the direction of the arrow A. Said roller 10 has a periphery which is serrated or is roughened in any other way as is known to provide friction rollers in order to enhance the driving engagement with the road wheels 2 and 3. In this way said wheels are driven in the direction of the arrows B and C, respectively.

By the reaction of the ground indicated by the arrows D and E, forces are exerted on the wheels 2 and 3 which have the effect to swing the wheel arms 6 and 7 about said pivots 8 and 9, respectively, in the direction of the arrows F and G. The result is that the road wheels 2 and 3 are pressed against the roller 10 with forces indicated by the arrows H and I, respectively. By the reaction of the driving roller 10 against said forces the tires of the wheels 2 and 3 (only shown by their circumferences) are submitted to a resilient deformation. It is this deformation which together with the resiliency of the tires by the forces D and E, provides the elastic suspension of the vehicle which may, in special cases, be sufficient if the several dimensions and the elasticity of the tires are well chosen to this object. If desired, the roller 10 itself may also be provided with a resilient tire. Since the drawing only serves to elucidate the principle of the invention, the deformation of the tires is not drawn.

The suspension described above requires opposite inclined positions of the wheel arms 6 and 7. In the embodiment according to FIG. 1 the pivots 8 and 9 are located lower than the stub axles 4 and 5, while their mutual distance is smaller than that between the axles 4 and 5. In the embodiment shown in FIG. 3, however, the pivots 8a and 9a of the wheel arms 6a and 7a are placed higher than the stub axles 4 and 5 and farther apart. In both cases the reactions of the ground indicated by the arrows D and E are transmitted by the wheels and act as forces H and I against the roller 10. By this position of the wheel arms and the resulting forces an effective frictional engagement is achieved between the wheel tires and the roller 10.

Figure 3:
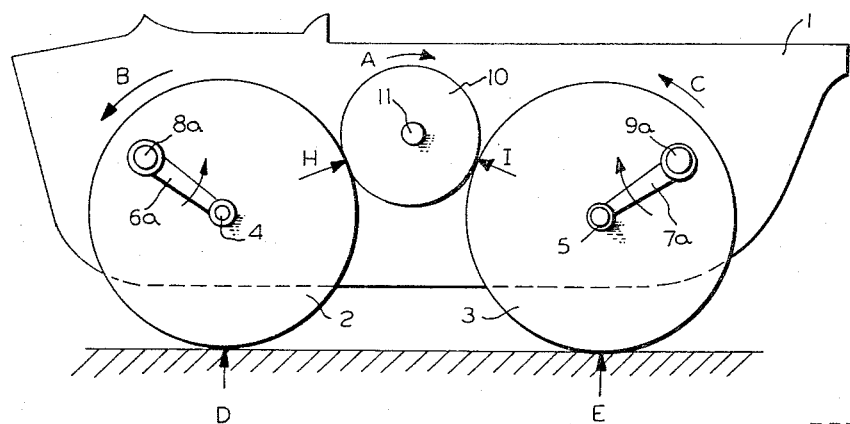

FIG. 3 shows finally an embodiment of the motor vehicle which corresponds substantially with FIG. 1, but in which the wheel arms have a different direction with respect to that of FIGS. 1 and 2. According to FIG. 3 the pivots 8a and 9a are above the axles 4 and 5 of the wheels and farther spaced so that the wheel arms 6a and 7a are inclined downwardly towards each other. The reactions D and E of the ground tends to swing the wheel arms 6a and 7a in the direction of the arrows in FIG. 3 with the result that the wheels 2 and 3 are forced against the roller 10 with the forces indicated by the arrows H and I.

Figure 4:
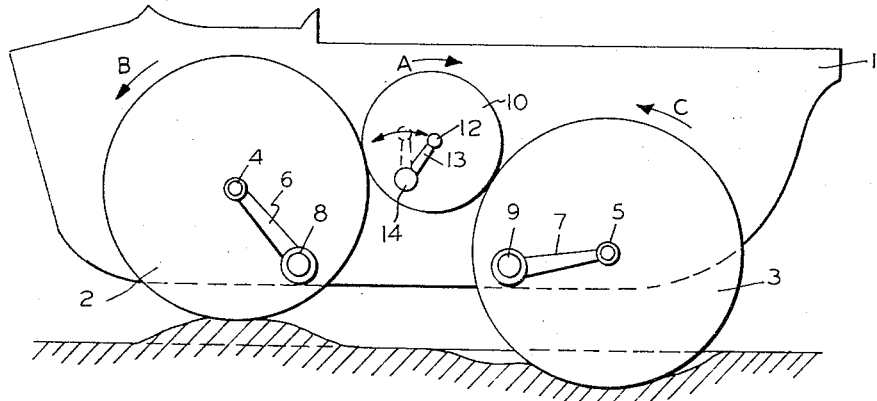
Figure 5:
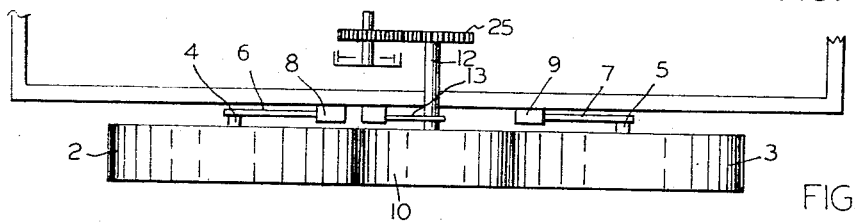
FIG. 5 is a top view of the left-hand part of the vehicle.

The embodiment shown in FIG. 4 corresponds with that shown in FIG. 1 however with the difference that the shaft 12 of the driving roller 10 is carried by an arm 13 which is adapted to swing forward and backward about a fixed pivot 14. Preferably the arm 13 is urged to a vertical centre position which is indicated in dotted lines under the influence of a not-shown elastic device. This elastic device may be a torsion spring which at the pivot 14 engages the arm 13. It is also possible to execute the arm 13 as a resilient member, e.g. as a leaf spring which is encased at its lower end and thus rigidly connected with the vehicle body.

If the vehicle as shown in FIG. 4 runs on a flat road or on another flat surface the circumstance presents itself as shown in FIG. 1; in this case the arm 13 assumes a vertical position. If now for example the front wheel 2 meets an elevation of the ground and the rear wheel 3 runs in a hole, the wheel arm 6 swings upwards about the pivot 8, while the wheel arm 7 swings downward about the pivot 9. This relative movement of the wheels 2 and 3 is permitted by the displaceable suspension of the driving roller 10. The situation shown in FIG. 4 for the left-hand side of the vehicle is independent from the movement of the wheels at the right-hand side of the vehicle.

The displacement of the shaft 12 of the driving rollers allows the wheels 2 and 3 to move in a way which may be compared with the circumstance as if the wheels would be suspended on a rocker beam. Consequently, the vehicle in FIG. 4 is especially adapted to be used on uneven ground since recesses and elevations of the ground will be passed without shocks.

Figure 6:
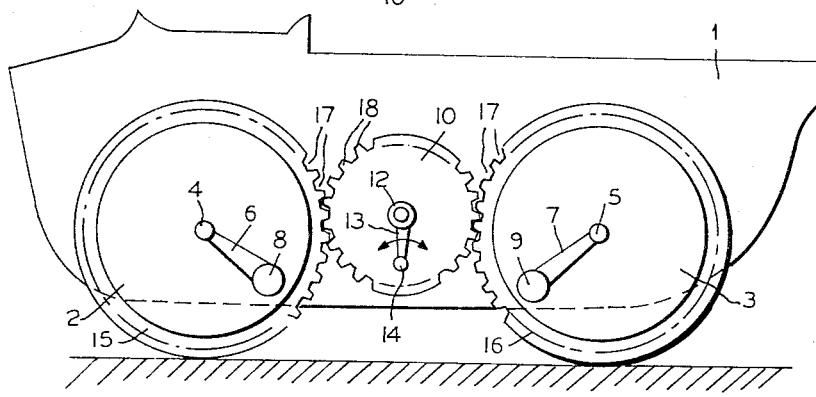
FIG. 6 is a side elevation of a fourth embodiment in which the wheels are provided with cross-country tires and in which the circumference of the driving roller is carried with a corresponding profile.

FIG. 6 shows an embodiment of a vehicle which corresponds with that of FIG. 4, however with the difference that the wheels 2 and 3 are provided with tires 15 and 16 respectively with a deep-grooved profile such as snow-tires. The driving roller 10 has a circumference or is provided with a tire the profile of which fits that of the tires of the wheels 2 and 3. It is clear that if the grooves 17 of the tires 15 and 16 are directed obliquely with regard to the radial plane of the wheel, the direction of the ribs 18 of the circumference of the driving roller 10 or of a tire mounted thereon, must be obliquely to the right.

If mud or snow should adhere in the grooves 17 of the tires 15 and 16, this mud or snow would be pressed away by the ribs 18. This cleaning action takes place continuously so that always a clean portion of the tires engages the ground. This cleaning action is independent of the circumstance whether the vehicle runs forwards or backwards.

Since the vehicle according to the embodiments of FIGS. 1 to 6 have no swivelling front wheels, the vehicle must be steered in a way as usual in track-laying vehicles, i.e. by a difference of speeds of the road wheels or other members at the left and at the right side of the vehicle. It is therefore that the driving roller 10 at the inner side of the bend may be released from the drive by disengaging the said clutches 23 and even may be braked in order to assist the steering of the vehicle. For this purpose brakes 26 are arranged on said shafts 36, 37 so that after releasing one of the clutches 23, the roller 10 at the corresponding side of the vehicle, and consequently also the wheels 2 and 3 are braked.

The principle of which FIGS. 1–6 give examples in the form of a small fourwheeled vehicle, may also be applied to other and larger motor vehicles such as trucks. The invention embraces namely a four-wheel-drive in general of which FIG. 7 gives an example.

Figure 7:
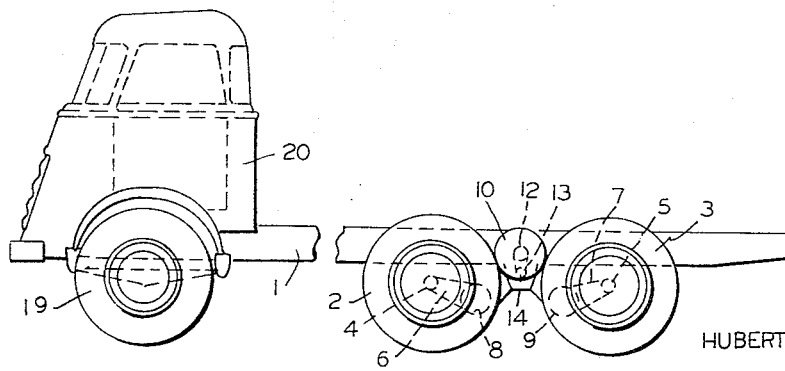
FIG. 7 is a side elevation of a fifth embodiment executed as a truck including steerable front wheels.

FIG. 7 shows the chassis of a truck which besides rear wheels 2 and 3 has also front wheels 19. The frame 1 carries a driver's cabin 20, but it is clear that any other body may be carried on the frame. The driving device of FIG. 4 shows the same references as FIGS. 1 to 3, so that a further description is superfluous.

What is claimed is:

1. A motor vehicle comprising a body, wheels placed in tandem at each side of said body, stub axles upon which said wheels are rotatably mounted, arms mounted on fixed pivots upon said body at one end having said stub axles rotatably mounted at the other end, said pivots being mounted on said body below said stub axles, a friction roller at each side of said vehicle located intermediate and above said stub axles in driving connection with the vehicle motor through transmission means engaging said wheels, said pivots being so arranged that by an upward force due to the reaction of the ground each of said tandem wheels is urged into driving engagement with said friction roller.

2. A motor vehicle as set forth in claim 1 wherein each said roller is mounted on a shaft movable forwardly or backwardly relative to the longitudinal direction of the vehicle.

References Cited

UNITED STATES PATENTS

| | | | |
|---|---|---|---|
| 680,891 | 8/1901 | Smith | 180—74 |
| 1,273,339 | 7/1918 | Eighmie | 180—6.2 |
| 1,897,944 | 2/1933 | Carter | 180—74 X |
| 2,380,181 | 7/1945 | Krenzien | 180—74 |
| 2,980,196 | 4/1961 | Van Der Bruggen | 180—73 |

FOREIGN PATENTS 176,514   3/1922   Great Britain.

BENJAMIN HERSH, *Primary Examiner.*

J. A. PEKAR, *Assistant Examiner.*